(12) United States Patent
Jain

(10) Patent No.: US 7,341,342 B2
(45) Date of Patent: Mar. 11, 2008

(54) EYEGLASSES

(76) Inventor: Anamika Jain, 708 Proud Eagle La., Las Vegas, NV (US) 89144

( * ) Notice: Subject to any disclaimer, the term of this patent is extended or adjusted under 35 U.S.C. 154(b) by 0 days.

(21) Appl. No.: 11/783,294

(22) Filed: Apr. 6, 2007

(65) Prior Publication Data

US 2007/0236650 A1    Oct. 11, 2007

Related U.S. Application Data

(60) Provisional application No. 60/790,810, filed on Apr. 11, 2006.

(51) Int. Cl.
*G02C 11/02* (2006.01)

(52) U.S. Cl. .......................... 351/52; 351/51; 351/114; 351/121

(58) Field of Classification Search ................ 351/114, 351/111, 116, 119, 121, 123, 51, 52, 66, 41, 351/158

See application file for complete search history.

(56) References Cited

U.S. PATENT DOCUMENTS

| | | |
|---|---|---|
| D164,228 S | 8/1951 | Field |
| 2,660,092 A | 11/1953 | Bloom |
| 4,153,346 A | 5/1979 | Gomer |
| 4,153,347 A | 5/1979 | Myer |
| 4,670,915 A | 6/1987 | Evans |
| D309,149 S | 7/1990 | Pouilloux |
| 4,953,967 A | 9/1990 | Somerville |
| 4,974,955 A | 12/1990 | Treadaway, Sr. |
| 5,007,728 A | 4/1991 | Magorien |
| D354,760 S | 1/1995 | Wolff |
| 5,483,303 A | 1/1996 | Hirschman |
| 5,500,694 A | 3/1996 | Roever et al. |
| 5,528,800 A | 6/1996 | Kliot |
| 5,539,561 A | 7/1996 | Khalifa |
| 5,541,676 A | 7/1996 | Pallat |
| 5,557,345 A | 9/1996 | Katzenmeyer et al. |
| D377,037 S | 12/1996 | Stolt |
| 5,652,635 A | 7/1997 | Kirschner |
| D396,052 S | 7/1998 | Stolt |
| 5,805,262 A | 9/1998 | Deveney |

(Continued)

FOREIGN PATENT DOCUMENTS

EP     0 723 176     7/1996

(Continued)

OTHER PUBLICATIONS http://www.extremeeyewear.com/store/product_info.php?products_id=35&osCsid=707dbb4ede564faba0cc53f4e63837dc "Modular Glasses" retrieved on May 24, 2005.

(Continued)

*Primary Examiner*—Hung X. Dang
(74) *Attorney, Agent, or Firm*—Richard C. Litman

(57) ABSTRACT

The eyeglasses have a lens frame in which lenses are mounted. Proximal ends of flexible temple members are removably attachable to opposite sides of the lens frame. The temple members are sized to extend over and behind the ears to the vicinity of the ear lobe. A counterweight is attached to the end of the temple members by a releasable fastener. The releasable fastener may be a clasp and a complementary receiving member.

20 Claims, 3 Drawing Sheets

U.S. PATENT DOCUMENTS

| | | |
|---|---|---|
| 6,024,446 A | 2/2000 | Hall et al. |
| 6,149,268 A | 11/2000 | Hall et al. |
| 6,231,181 B1 | 5/2001 | Swab |
| 6,582,075 B1 | 6/2003 | Swab et al. |
| 6,719,425 B2 | 4/2004 | Conner |
| 6,736,504 B1 | 5/2004 | Hermsen |
| 6,742,891 B2 | 6/2004 | Chen |
| 6,834,952 B2 | 12/2004 | Polovin |
| D505,150 S | 5/2005 | Yee et al. |
| 6,908,194 B1 | 6/2005 | Johnson |
| 2005/0036103 A1 | 2/2005 | Bloch |

FOREIGN PATENT DOCUMENTS

| | | |
|---|---|---|
| FR | 2 663 757 | 12/1991 |
| JP | 57-210321 | 12/1982 |

OTHER PUBLICATIONS http://www.shieldseyewear.com/control_cord.html "Control Cord", Shields SportGlasses retrieved on Mar. 2, 2006.

US 7,341,342 B2

EYEGLASSES

CROSS-REFERENCE TO RELATED APPLICATION

This application claims the benefit of U.S. Provisional Patent Application Ser. No. 60/790,810, filed Apr. 11, 2006.

BACKGROUND OF THE INVENTION

1. Field of the Invention

The present invention relates to eyewear, and more particularly to eyeglasses having a frame for corrective lenses or for sunglasses that includes interchangeable temple members made from flexible members with interchangeable counterweights at the end of the flexible members to retain the temple members over the ears.

2. Description of the Related Art

Many people require eyeglasses with corrective lenses either for reading or for viewing objects at a distance. Conventional eyeglass frames, while quite functional, are often not very attractive. Although the frames may match one outfit, they may not match another, and wearing the same frames day after day may prove monotonous. Unfortunately, conventional eyeglass frames are often rigidly tailored to the particular prescription lenses, so that it becomes difficult or impossible to even wear a different style of temple piece with the same lens frame. Furthermore, as visual acuity changes, a different prescription lens may be required that does not fit into the current lens frames, so that it becomes necessary to replace the entire frame as a unit.

Similar problems exist with respect to sunglasses. Many people who wear sunglasses prefer a different style of frame to suit the outfit, the occasion, or their mood. However, conventional sunglass frames do not permit changing only a part of the frames. It's usually a matter of all or nothing, which can quickly become very expensive.

Consequently, there is a need for eyeglasses, whether for corrective lenses or for sunglasses that provide shade and protection from ultraviolet radiation, that have frames with interchangeable parts in order to change one's appearance while retaining the same lens frames, or for changing the lens frames while retaining the same temple and ear pieces. Thus, eyeglasses solving the aforementioned problems are desired.

SUMMARY OF THE INVENTION

The eyeglasses have a lens frame in which lenses are mounted. Proximal ends of flexible temple members are removably attachable to opposite sides of the lens frame. The temple members are sized to extend over and behind the ears to the vicinity of the ear lobe. A counterweight is attached to the end of the temple members by a releasable fastener. The releasable fastener may be a clasp and a complementary receiving member.

The removable temple members and counterweight attachments to the temple members allow users to change any one or all of the parts. The part interchangeability of the eyeglasses provides users with the capability to have different combinations of chains and counterweights for any given lens frame, thus allowing diversity in their eyewear without having the added expense of new prescription lenses.

The three eyewear components, i.e., lens frames, chains, and counterweights, being in many different styles and colors, allow endless possibilities of mixing and matching.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
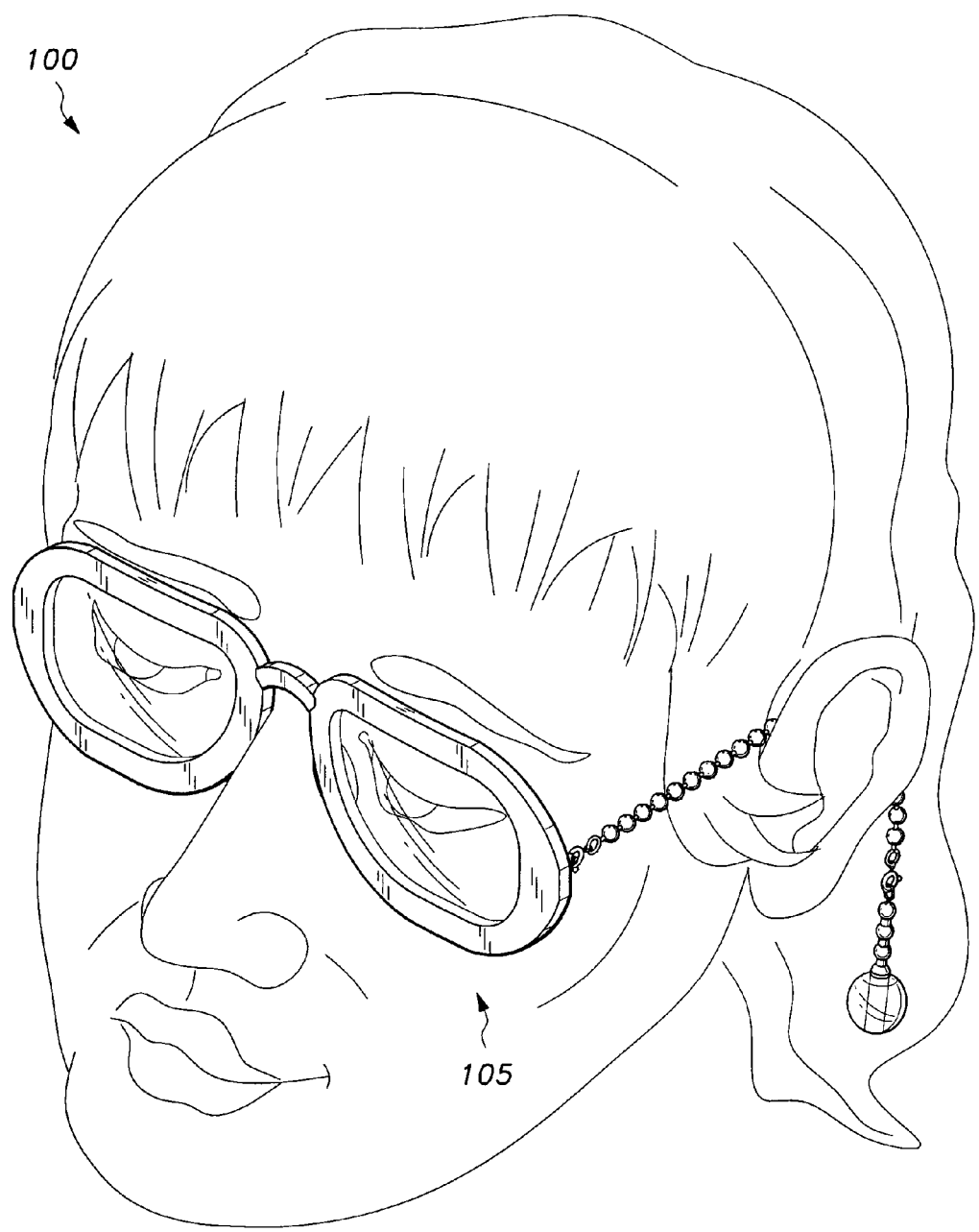
FIG. 1 is an environmental, perspective view of an embodiment of eyeglasses according to the present invention.
Figure 2:
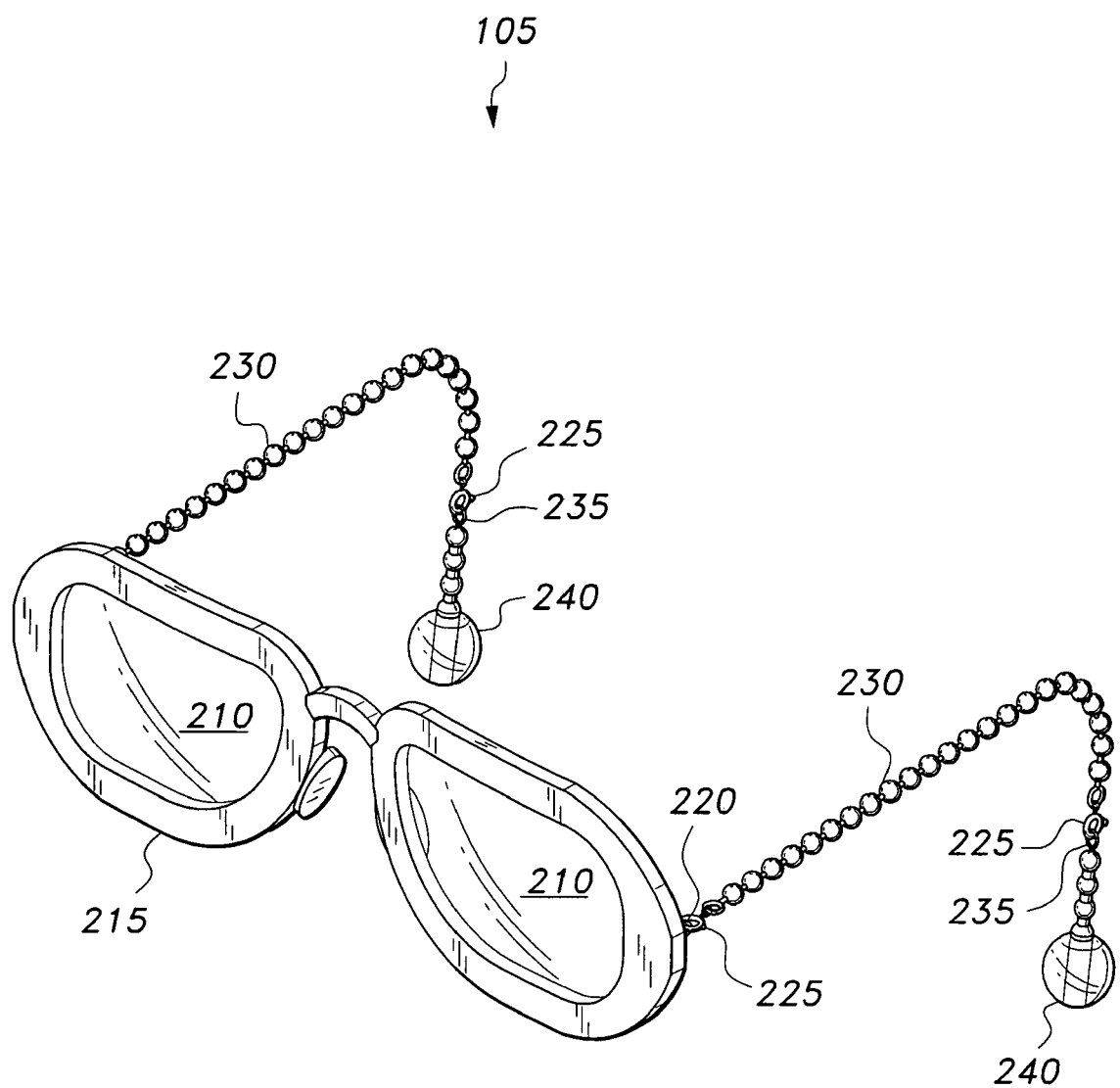
FIG. 2 is a perspective view of the eyeglasses of FIG. 1.
Figure 3:
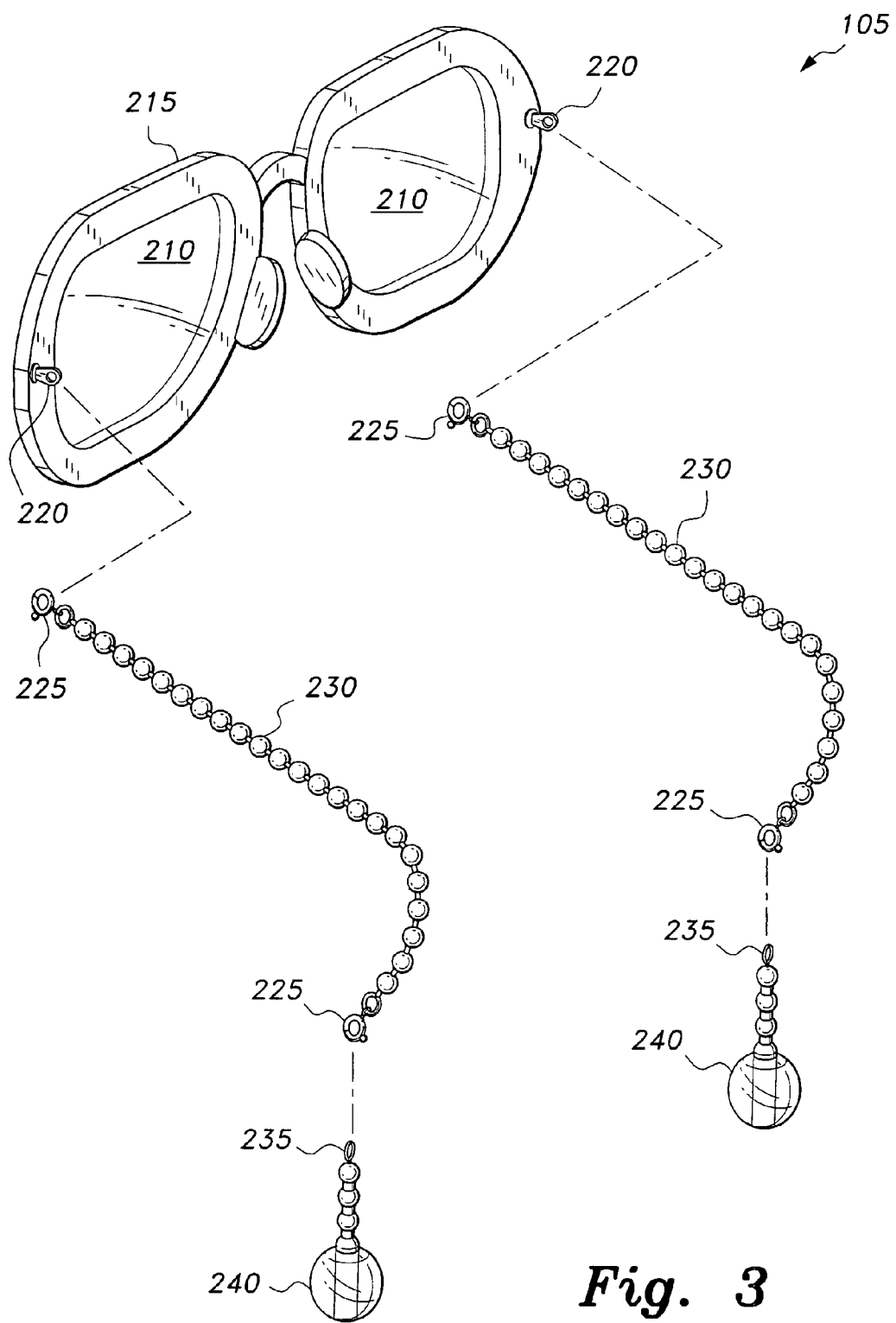
FIG. 3 is an exploded, perspective view of the eyeglasses of FIGS. 1 and 2.

The present invention includes eyeglasses having a lens frame, interchangeable flexible temple members, and interchangeable counterweights attached to the ends of the temple pieces. An exemplary embodiment of the eyeglasses is shown in FIGS. 1, 2 and 3, and designated generally as 105. The eyeglasses 105 comprise a lens frame 215, a pair of flexible temple members 230, each temple member 230 being adapted to extend over and behind the wearer's ear, and counterweights 240 attached to the ends of the temple members 230 just below the ear lobes.

Lens frame 215 may be of conventional construction, e.g., made of metal or molded of a suitable plastic material, such as polystyrene, polycarbonate, PVC, ABS, and the like, and designed to frame and support lenses 210.

Lens frame 215 and lenses 210 may be of a wide variety of styles, shapes and colors, so long as the frames 215 provide a safe and secure attachment for the lenses 210. In addition, the frame 215 may include a comfortable bridge over a wearer's nose to aid fitting of the frame 215 on the wearer's face.

Laterally opposing sides of the frame 215 have suitable mounts, such as embedded eyelets 220, each eyelet defining an aperture to which a proximal end of temple members 230 is removably attached. Preferably, eyelets 220 are embedded into frame 215 so that the apertures are vertically disposed. The flexible temple members 230 are attached to eyelets 220 by a spring clasp 225, which engages and disengages the eyelets 220 for attaching and removing the temple members 230 to and from the lens frame 215. Alternatively to spring clasp 225, it is contemplated by the present invention to utilize any type of releasable fastener suitable for attaching temple members 230 to lens frame 215.

A counterweight 240 is attached to a distal end of each temple member 230 by a spring clasp 225, which is linked to a ring 235 or other link at the end of a pendant chain permanently attached to the counterweight 240. Alternatively to spring clasp 225, it is contemplated by the present invention to utilize any type of releasable fastener suitable for attaching counterweight 240 to temple member 230.

The temple members 230 may be formed by any flexible and preferably limp cord or chain-like structure. Metal chain links, multistrand straight or braided cord, a string of beads, a chain or string of genuine or imitation gemstones and the like, are all within the scope of the present invention.

Moreover, counterweights 240 may be chosen from a wide variety of articles and materials, such as, geodesic crystalline-appearing spheroids similar to those shown in FIGS. 1-3, charms, metal plates having engraved indicia (e.g., a monogram), or other decorative items having sufficient weight to apply tension to the temple pieces to keep the lens frame 215 mounted on the nose and to retain the temple pieces 230 stretched over the ears. Counterweights 240 may be molded in plastic, or other suitable material, having an appearance that matches or complements frame 215.

It should be noted that counterweights 240 may have various shapes and configurations, which may be embossed with designs, figures, metallic medallions or rings, semi-precious stone carved in any design or figure, and the like.

The manner in which the eyeglasses 105 are worn and function is now readily apparent. Frame 215 is placed in position on the face and temple members 230 are pulled back over the ears so that counterweights 240 may hang freely behind the ear, thus taking up any slack in the flexible temple members 230 while holding them in a taut condition to secure the frame 215 in place on the wearer's face.

The lens frame 215, temple members 230, and counterweights 240 of eyeglasses 105 enable people to change any one or all of the aforementioned components. For example, if a person purchases one style of the lens frame 215, he or she can purchase many different styles of the flexible temple members 230 and counterweights 240, allowing the wearer to have diversity in his or her eyewear without having the added expense of new prescription lenses. Furthermore, the lenses need not be prescription lenses, but may be polarized lenses of the type popularly used in sunglasses.

For those not concerned about prescription eyewear, the three components, i.e., lens frame 215, temple members 230, and counterweights 240 are provided in many different styles and colors to allow virtually endless possibilities of mixing and matching.

It is to be understood that the present invention is not limited to the embodiment described above, but encompasses any and all embodiments within the scope of the following claims.

I claim:

1. An eyeglass frame, comprising:
    a lens frame adapted for mounting a pair of lenses therein;
    a pair of flexible temple members, each of the temple members having a proximal end and a distal end;
    a pair of first releasable fasteners having a first component attached to the lens frame and a second component attached to one of the temple members, respectively, for releasably attaching the temple members to the lens frame;
    a pair of counterweights; and
    a pair of second releasable fasteners having a first component attached to the distal end of the temple members and a second component attached to the counterweights, respectively;
    wherein the counterweights are adapted for applying tension to the temple members in order to retain the temple members draped over a user's ears and the lens frame mounted on the user's nose.

2. The eyeglass frame according to claim 1, wherein each of the flexible temple members comprise a plurality of threaded beads.

3. The eyeglass frame according to claim 1, wherein each of said flexible temple members comprises a cord.

4. The eyeglass frame according to claim 1, wherein each of said flexible temple members comprises chain links.

5. The eyeglass frame according to claim 1, wherein the first component of the pair of first releasable fasteners comprises an eyelet embedded in the lens frame and the second component of the pair of first releasable fasteners comprises a spring clasp.

6. The eyeglass frame according to claim 1, wherein the first component of the pair of second releasable fasteners comprises a spring clasp and the second component of the pair of second releasable fasteners comprises a ring.

7. The eyeglass frame according to claim 1, wherein each said counterweight comprises a spheroid.

8. The eyeglass frame according to claim 1, wherein each said counterweight comprises a plate, said plate having user-selectable indicia formed thereon.

9. The eyeglass frame according to claim 1, wherein each said counterweight comprises a stone carving.

10. The eyeglass frame according to claim 1, wherein each said counterweight comprises a plastic mold.

11. The eyeglass frame according to claim 1, wherein the lens frame is made of plastic.

12. The eyeglass frame according to claim 1, wherein the lens frame is made of metal.

13. An eyeglass frame, comprising:
    a lens frame adapted for mounting a pair of lenses therein;
    a pair of flexible temple members, each of the temple members having a proximal end and a distal end;
    a first pair of releasable fasteners attaching the temple members to the lens frame;
    a pair of counterweights; and
    a second pair of releasable fasteners attaching the counterweights to the temple pieces, the counterweights are adapted for applying tension to the temple members in order to retain the temple members draped over a user's ears and the lens frame mounted on the user's nose.

14. The eyeglass frame according to claim 13, wherein each said counterweight comprises a pendant.

15. The eyeglass frame according to claim 13, wherein each said counterweight comprises an ornament and a tether extending from the ornament, the ornament and the tether forming a pendant.

16. The eyeglass frame according to claim 15, wherein said ornament is selected from the group consisting of geodesic crystalline-appearing spheroids, charms, and metal plates having engraved indicia formed thereon.

17. The eyeglass frame according to claim 13, wherein each said temple member is selected from the group consisting of metal chain links, multistrand cord, a string of beads, a chain of gemstones, and a string of gemstones.

18. The eyeglass frame according to claim 13, wherein each said first pair of releasable fasteners and each said second pair of releasable fasteners comprise a spring clasp and a mating retainer loop.

19. An eyeglass frame, comprising:
    a lens frame adapted for mounting a pair of lenses therein;
    a pair of flexible temple members;
    a pair of pendants;
    means for releasably attaching the temple members to opposite ends of the lens frame, respectively, by hand and without tools; and
    means for releasably attaching the pendants to the pendants opposite the lens frames by hand and without tools, the pendants applying tension to the temple members in order to retain the temple members draped over a user's ears and the lens frame mounted on the user's nose;
    whereby the temple members and the pendants are removable and interchangeable in order to provide the eyeglass frame with an altered ornamental appearance.

20. The eyeglass frame according to claim 19, wherein said lens frame further comprises an eyelet embedded in opposite ends of the lens frame, said means for attaching the temple members comprising a spring clasp extending from each of the temple members, further, each said pendant having user-selectable indicia formed thereon.

* * * * *